United States Patent [19]

Shurtliff et al.

[11] Patent Number: 4,873,794

[45] Date of Patent: Oct. 17, 1989

[54] HOLDER FOR MILLING COUNTERSINK FILLER PLUGS

[75] Inventors: Jeffrey L. Shurtliff, Clinton; Michael E. Thomas, Layton, both of Utah

[73] Assignee: The United States of America as represented by the Secretary of the Air Force, Washington, D.C.

[21] Appl. No.: 865,323

[22] Filed: May 21, 1986

[51] Int. Cl.$^4$ .............................................. B24B 41/06
[52] U.S. Cl. .............................. 51/227 R; 51/216 R; 51/290
[58] Field of Search ................. 51/277, 227 R, 216 R, 51/216 T, 216 P, 216 H, 229 R, 290; 269/47, 49; 279/102

[56] References Cited

U.S. PATENT DOCUMENTS

| | | | |
|---|---|---|---|
| 195,930 | 10/1877 | Jowitt | 51/216 R |
| 953,178 | 3/1910 | Peck | 51/216 R |
| 1,173,288 | 2/1916 | McDermid | 51/216 R |
| 1,450,452 | 4/1923 | Randall | 269/47 |
| 1,519,828 | 12/1924 | Fusay | 51/216 R |
| 1,609,103 | 11/1926 | Baldwin | 269/47 |
| 2,488,060 | 11/1949 | Hazard | 51/216 R |
| 2,735,246 | 2/1956 | Ponting | 51/229 |
| 3,490,088 | 1/1970 | Wielinski | 51/216 R |

FOREIGN PATENT DOCUMENTS 0117819 12/1926 Switzerland ............. 51/227 R

Primary Examiner—Robert Rose
Attorney, Agent, or Firm—Jacob N. Erlich; Donald J. Singer

[57] ABSTRACT

A holder for milling a countersink filler plug, the holder having a bolt-like configured support on which the filler plug is mounted prior to the milling procedure. A sleeve slidably circumscribes the bolt-like support and is of a height less than the height of the bolt-like support. Adjustment washers are positioned adjacent the sleeve in order to regulate the position of the sleeve relative to the bolt-like support. The filler plug rests upon the sleeve circumscribing a portion of the bolt-like support such that the porton of the filler plug which is not in abutment with the bolt-like support can be easily removed by the milling tool during the milling procedure.

3 Claims, 1 Drawing Sheet

HOLDER FOR MILLING COUNTERSINK FILLER PLUGS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the manufacture and installation of countersink filler plugs, and, more particularly, to a device capable of securely holding such a filler plug adjacent a milling or grinding machine in order to control the specific amount of material to be removed from the filler plug prior to its installation within a countersunk hole.

There are many instances when it is highly desirable to fill countersunk holes which have been predrilled to accommodate specific type of fasteners. This is accomplished by the use of countersink filler plugs preferably made of aluminum. The utilization of such filler plugs is especially useful in the retro-fitting and repairing of fatigue or cracked skins on aircraft wings, doors, fuselages, etc. It is essential that unused countersunk holes be filled in order to insure the integrity of the outer surface of the aircraft in order to insure correct aerodynamic flow around the opening when the aircraft is in flight. In addition, there are situations when the filled in countersunk holes require enlarging and thereafter the installation of new countersink filler plugs.

It is current practice to fill such countersunk holes with aluminum plugs, of substantially the correct dimensions, which are glued, into the holes. In many instances, however, the inserted filler plugs are not flush with the skin surface after insertion thereof and therefore must be sanded or ground down to provide the required smooth aerodynamic surface. In the past this grinding or sanding operation took place with the filler plug in place and as a consequence during the grinding procedure many of the filler plugs become dislodged and flew out creating a safety hazard to surrounding personnel as well as substantially increasing the repair time. As a result, the filler plugs had to be reglued within the countersunk hole and resanded to the desired shape with the inherent possibility that they may flip out once again.

Such a procedure is not only costly, but also as pointed out hereinabove creates a substantial safety problem. Normally, the installation of approximately 200 countersink filler plugs with current procedures takes approximately 3½ days to complete. It is therefore highly desirable to provide a system in which these filler plugs can be ground to their desired dimensions without creating a safety hazard and yet substantially decrease the amount of repair time.

SUMMARY OF THE INVENTION

The present invention overcomes the problems encountered in the past and as set forth in detail hereinabove by providing a device which not only securely positions a filler plug adjacent a milling machine during the grinding procedure, but also is capable of controlling the exact amount of material to be removed from the filler plug prior to its insertion within a countersunk hole. In addition, the present invention provides a unique method of inexpensively producing such a filler plug holding device.

In general, countersink filler plugs are made of aluminum and are configured to be fitted and subsequently glued within unused countersunk holes located, preferably, in the outer surface of an aircraft. In general, a countersunk hole is formed as the exterior portion of a drilled hole in order to accept the head of a screw. In this manner the outer surface remains virtually intact and, in the case of aircraft, aerodynamically sound. The holding device of this invention is capable of securely positioning countersink filler plugs adjacent a milling machine during the grinding procedure. The holder may be made in a variety of diameters and sizes related to the diameter of the particular hole with which the countersink filler plug is associated.

For example, the holder is generally made of a bolt like configuration having a shank approximately 2 inches long with a hex-head configured base which acts as a handle or holding means during the grinding or milling procedure. The diameter of the cylindrical shank is matched to the diameter of the hole having the countersunk portion into which the countersink filler plug is to be placed. A sleeve or bushing is slidably mounted over the shank and is of a height slightly less than the height of shank. In this manner when the sleeve is positioned over the shank, a portion of the shank extends beyond the top surface of the sleeve. The amount of the shank which is exposed above the top surface of the sleeve is equivalent to the height of the countersunk portion of the hole to be filled. An adjustment means is situated between the bottom of the sleeve and the top surface of the base or handle in order to vary the amount of exposure of the shank. The height adjustment means is generally in the fom of a number of differently sized washers which are slid over the shank prior to the installation of the sleeve thereover. In this manner, the number and thickness of the washers utilized determine the amount of exposed surface of the shank with respect to the sleeve.

In use, when a filler plug is required to be ground or milled to a predetermined height, a measurement is first made of the exact height of the countersunk portion to the hole to be filled. This particular dimension is then measured from the top of the shank of the hole of this invention and appropriately marked. The appropriate height of the sleeve with respect to the top of the shank is adjusted by the number of height adjustment washers interposed between the sleve and the base of the holder. Consequently, when the countersink filler plug is mounted on the exposed portion of the shank it rests upon the top surface of the sleeve. The portion of the countersink filler plug to be removed is exactly positioned above the shank.

The holder of this invention, with filler plug thereon, is then positioned adjacent an appropriate milling tool or machine and the countersink filler plug is milled until the milling head strikes the hard shank of the holder which is preferably made of steel. Ensuing sparks indicate that the appropriate amount of material has been removed from the aluminum countersink filler plug. The filler plug may then be removed from the holder and inserted within the countersunk portion of the hole, and glued in place without further sanding or grinding.

Also forming part of the present invention is an extremely cost efficient manner in which to produce the holder for milling countersink filler plugs. This method incorporates the use of readily available bolts approximately 2 inches in length and having a diameter equal to the diameter of the hole contained within the countersink filler plug (which is also the diameter of the countersunk hole). Thereafter, the threaded end of the bolt is removed leaving the bolt shank and hex-head (base) in place. An appropriately sized sleeve is then mounted upon the shank of the bolt with differently sized wahsers being utilized in order to adjust the height of the sleeve with respect to the shank in the manner described hereinabove.

It is therefore an object of this invention to provide a holder for milling countersink filler plugs.

It is a further object of this invention to provide a holder capable of controlling the amount of material to be removed from a countersink filler plug during the milling procedure.

It is another object of this invention to provide a cost efficient method of producing a holder for milling a countersink filler plug.

It is still another object of this invention to provide a holder for milling a countersink filler head which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawings and its scope will be pointed out in the appended claims.

DETAILED DESCRIPTION OF THE PREFERRED EMBODIMENT

Figure 1:
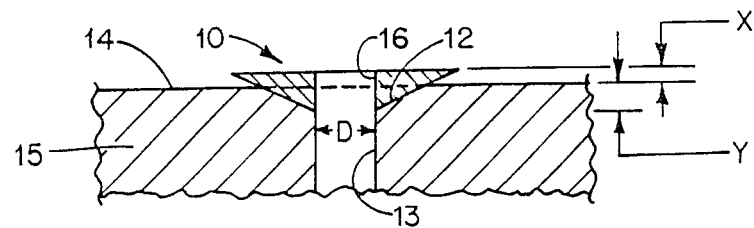
FIG. 1 is a side elevational view, shown partly in cross section, of a countersink filler plug inserted within the countersunk portion of a hole with a portion of the filler plug protruding above the surface containing the hole.

Reference is now made to FIG. 1 of the drawings which clearly illustrates a typical countersink filler plug 10, preferably made of aluminum, and positioned within a countersunk portion 12 of a hole 13 located within the surface 14 of, for example, an aircraft wing 15. It is to be noted that although the countersunk portion 12 is depicted in FIG. 1 within an aircraft 15, the present invention is effective in holding the filler plug 10 utilized with respect to any countersunk body or object.

As illustrated in FIG. 1 of the drawings, the countersink filler plug 10 extends beyond the top surface 14 a distance X, which is representative of the amount of material to be removed so that the countersink filler plug 10 lies flush with top surface 14. Also, as illustrated in FIG. 1, filler plug 10 is depicted as having a centrally located opening 16 of a diameter equal to the diameter, D, of the main portion of hole 13.

Figure 2:
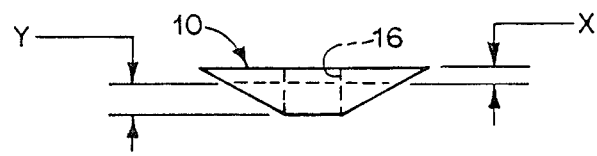
FIG. 2 is a side elevational view of a countersink filler plug illustrating the amount of material which is to be removed during the milling procedure.

FIG. 2 of the drawings illustrates countersink filler plug 10 having its central opening 16 shown in dotted with the material that is to be removed, X, separated from the remaining portion of the countersink filler plug 10 also by dotted lines.

Figure 3:
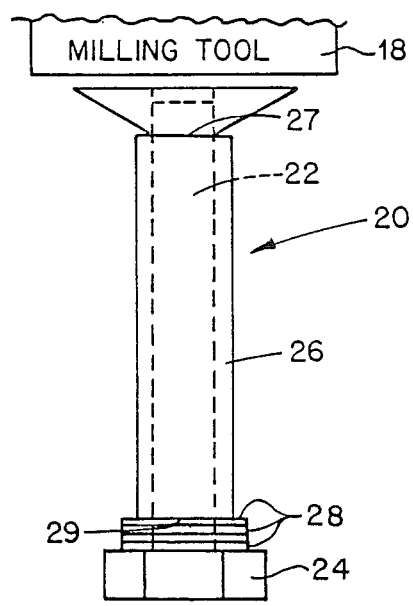
FIG. 3 is a side elevational view, shown partly in cross section, of the holder of this invention for milling countersink filler plugs.

As pointed out hereinabove, in the past, the grinding of filler plug 10 took place with plug 10 positioned directly in countersunk portion 12 as shown in FIG. 1. As a consequence thereof, during the grinding procedure many of the filler plugs 10 were dislodged and created a severe safety hazard. With the present invention the countersink filler plug 10 may be ground to its desired dimensions prior to the final installation and securement within the countersunk portion 12 of hole 13 by means of a conventional grinding or milling machine or tool 18 illustrated in FIG. 3. In order to do so, it is necessary to position the countersink filler plug 10 next to the milling tool 18. This is accomplished by means of holder 20 of the present invention clearly illustrated in FIG. 3 of the drawings. Holder 20 is made up of an elongated shaft or shank 22 having a base 24 and made of a hard material such as steel. The shaft or shank 22 is of a predetermined height and predetermined diameter with the outer diameter of shank 22 being equal to the diameter of the opening 16 of the countersink filler plug 10.

A sleeve 26 is slidably mounted upon shank 22 and is of a height slightly less than the height of the shank 22. The exact amount of the shank 22 which is exposed above the top surface 27 of sleeve 26 is effected by the height of a plurality of adjustment washers 28 which are interposed between the bottom surface 29 of sleeve 26 and the top surface of base 24. By the addition or removal of height adjustment washers 28, the exact amount of exposed shank 22 can be altered.

In use, countersink filler plug 10 is positioned upon the shank 22 with hole 16 of plug 10 matingly accepting shank 22. In the position illustrated in FIG. 3, the bottom of the filler plug 10 rests upon the top surface 27 of sleeve 26. The exact amount of shank 22 exposed above the top surface 27 of sleeve 26 is equal to the height Y of the countersunk portion 12 of hole 13. The amount of material, X, which is to be removed from the filler plug 10 prior to its securement within the countersunk portion 12 of hole 13 is also illustrated in FIGS. 1 and 2 of the drawings.

As pointed out above, this exact amount of material, X, to be removed is established by the size of the exposed shank 22. Consequently, grinding or milling of the countersink filler plug 10 takes place until the top surface of filler plug 10 lies flush with the top surface of the exposed shank 22.

Stated more succinctly, the countersink filler plug 10 is inserted on shank 22 and holder 20 is positioned adjacent any conventional grinding or milling tool 18. Grinding takes place until the material from the filler plug 10 has been removed to such an extent that the milling tool 18 engages the top surface of the steel shank 22 and sparks are observed emanating therefrom. The sparks indicate that the desired amount of material has been removed from the countersink filler plug 10 and the plug is ready for insertion within the countersunk portion 12 of hole 13 as illustrated in FIG. 1 of the drawings.

Although the holder 20 of the present invention can be manufactured from a number of various components, an extremely cost efficient method of manufacture of the holder 10 of the present invention can be accomplished by the utilization of a conventional bolt having a hex-head at one end thereof and threads at the other end thereof. The first step in the process is to remove the threaded portion of the bolt leaving in place a device which conforms to holder shank and base 22, 24 illustrated in FIG. 3 of the drawings. In this manner a number of different sized shanks can be utilized as a holder with the dimensions of the shanks conforming to standard bolt sizes equivalent to hole 13. As a result many different sized countersink filler plugs 10 can be accommodated by the present invention. Conventional washers of different thicknesses can be utilized as the height adjustment washers 28 interposed between the bottom 29 of sleeve 22 and base 24.

It is therefore readily apparent from the above description that the holder 20 of the present invention utilizes the depth of the hole into which the filler plug 10 is to be placed in order to adjust the amount of the shank which protrudes out of sleeve 26. This is accomplished by placing one or more thin washers 28 over shank 22 so that they fit intermediate base 24 and sleeve 26. The number of washers 28 will determine the amount shank 22 protrudes above sleeve 26. The shank is then positioned within hole 16 of filler plug 10. Since the filler plug 10 is made of aluminum and shank 22 is made of steel, filler plug 10 is milled until the milling tool strikes the harder shank material, at which time sparks will occur. The remaining filler plug 10 then equals the exact depth of the countersunk portion 12 of hole 13. As a result, filler plug 10 can be inserted into a countersunk hole 13 flush with the surface 14 and glued without further sanding. In such a procedure the milling and installation of approximately 200 countersink filler plugs 10 can be performed in approximately 4 hours. This is a substantial time reduction over the 3½ day procedure with past devices.

Although this invention has been described with reference to a particular embodiment, it will be understood that this invention is also capable of further and other embodiments within the spirit and scope of the appended claims.

We claim:

1. A holder for milling a surface of a countersink filler plug, said filler plug being made of a material having a predetermined hardness and having a hole therein of a preselected diameter, and said hole having a longitudinal axis substantially perpendicular to said surface of said filler plug, said holder comprising:

means having a shank made of a material harder than said predetermined hardness of said filler plug and a base for supporting said filler plug adjacent a milling tool, said shank being of a predetermined height and a predetermined diameter, said predetermined diameter being slightly less than said preselected diameter of said hole in said filler plug;

a sleeve slidably mounted upon said shank and being of a height slightly less than said predetermined height of said shank; and height adjustment means interposed between an end of said sleeve and said base of said support means for controlling the position of said sleeve relative to said support means in order to expose a predetermined amount of said shank beyond said sleeve;

whereby said predetermined amount of said shank protrudes into said hole of said filler plug so as to mount said filler plug upon said support means in abutting relationship with said sleeve in order to control the amount of material which remains as part of said filler plug during the milling procedure.

2. A holder for milling a countersink filler plug as defined in claim 1 wherein said height adjustment means comprises at least one removable washer-like element.

3. A holder for milling a countersink filler as defined in claim 1 wherein said shank is made of steel.

* * * * *